US009683161B2

(12) United States Patent
Le Roy-Delage et al.

(10) Patent No.: US 9,683,161 B2
(45) Date of Patent: *Jun. 20, 2017

(54) SELF-REPAIRING CEMENTS (75) Inventors: Sylvaine Le Roy-Delage, Paris (FR); Laure Martin-Al-Khatib, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/814,723

(22) PCT Filed: Jul. 5, 2011

(86) PCT No.: PCT/EP2011/003442
§ 371 (c)(1),
(2), (4) Date: Feb. 27, 2013

(87) PCT Pub. No.: WO2012/022399
PCT Pub. Date: Feb. 23, 2012

(65) Prior Publication Data
US 2013/0146286 A1    Jun. 13, 2013

(30) Foreign Application Priority Data
Aug. 17, 2010   (EP) ..................................... 10290450

(51) Int. Cl.
*E21B 33/13* (2006.01)
*C09K 8/467* (2006.01)
(Continued)

(52) U.S. Cl.
CPC .............. *C09K 8/467* (2013.01); *C04B 18/20* (2013.01); *C04B 18/22* (2013.01); *C04B 28/02* (2013.01);
(Continued)

(58) Field of Classification Search
CPC ......... E21B 33/13; E21B 33/138; E21B 33/14
See application file for complete search history.

(56) References Cited

U.S. PATENT DOCUMENTS 5,300,573 A  *  4/1994  Patel ............................ 525/109
5,518,996 A     5/1996  Maroy et al.
(Continued)

FOREIGN PATENT DOCUMENTS

CA       2117276       6/2006
EA       010638        10/2008
(Continued)

OTHER PUBLICATIONS

"Styrene-butadiene and styrene-isoprene block copolymers (SBR)." Encyclopaedia Britannica. Encyclopaedia Britannica Online Academic Edition. Encyclopdia Britannica Inc., 2014. Web. Aug. 20, 2014. <http://www.britannica.com/EBchecked/topic/570382/styrene-butadiene-and-styrene-isoprene-block-copolymers>.*
(Continued)

*Primary Examiner* — Angela M DiTrani
*Assistant Examiner* — Andrew H Sue-Ako
(74) *Attorney, Agent, or Firm* — Andrea E. Tran (57) ABSTRACT

A self-adaptive cement formulation includes cement, water and thermoplastic block-polymer particles. The set cement demonstrates self-healing properties when exposed to methane, and is particularly suited for well-cementing applications. After placement and curing, the self healing properties help maintain zonal isolation should bonding be disrupted between the set cement and the formation or a casing string, should cracks or defects appear in the set-cement matrix, or both.

12 Claims, 5 Drawing Sheets

(51) Int. Cl.
*C04B 18/20* (2006.01)
*C04B 18/22* (2006.01)
*C04B 28/02* (2006.01)
*C09K 8/42* (2006.01)

(52) U.S. Cl.
CPC .............. *C09K 8/426* (2013.01); *C09K 8/428* (2013.01); *E21B 33/13* (2013.01); *Y02W 30/96* (2015.05)

(56) References Cited

U.S. PATENT DOCUMENTS

| | | | |
|---|---|---|---|
| 5,575,841 | A | 11/1996 | Dry |
| 5,660,624 | A | 8/1997 | Dry |
| 5,945,461 | A * | 8/1999 | Gosiewski et al. ............ 521/123 |
| 5,989,334 | A | 11/1999 | Dry |
| 6,261,360 | B1 | 7/2001 | Dry |
| 6,296,057 | B2 | 10/2001 | Thiercelin |
| 6,458,198 | B1 | 10/2002 | Baret et al. |
| 6,527,849 | B2 | 3/2003 | Dry |
| 6,645,288 | B1 | 11/2003 | Dargaud et al. |
| 6,832,651 | B2 | 12/2004 | Ravi et al. |
| 6,902,001 | B2 | 6/2005 | Dargaud et al. |
| 6,907,929 | B2 | 6/2005 | Leroy-Delage et al. |
| 7,350,573 | B2 * | 4/2008 | Reddy ........................ 166/285 |
| 7,527,095 | B2 | 5/2009 | Bloess et al. |
| 7,530,396 | B1 | 5/2009 | Reddy et al. |
| 7,578,347 | B2 | 8/2009 | Bosma et al. |
| 8,800,656 | B2 * | 8/2014 | Le Roy-Delage et al. ... 166/293 |
| 2007/0017676 | A1 | 1/2007 | Reddy et al. |
| 2007/0137528 | A1 | 6/2007 | Le Roy-Delage et al. |
| 2007/0204765 | A1 | 9/2007 | Le Roy-Delage et al. |
| 2008/0099203 | A1 | 5/2008 | Mueller et al. |
| 2009/0071650 | A1 | 3/2009 | Roddy et al. |
| 2009/0139710 | A1 * | 6/2009 | Robisson .............. C08L 15/005 166/208 |
| 2010/0087079 | A1 * | 4/2010 | Pyun et al. .................... 439/271 |

FOREIGN PATENT DOCUMENTS

| | | |
|---|---|---|
| EP | 1129047 | 11/2002 |
| EP | 1394133 | 3/2004 |
| EP | 2025732 | 2/2009 |
| RU | 2351745 | 4/2009 |
| WO | 00/37387 | 6/2000 |
| WO | 01/70646 | 9/2001 |
| WO | 03/068708 | 8/2003 |
| WO | 2004/101951 | 11/2004 |
| WO | 2004/101952 | 11/2004 |
| WO | 2009/019471 | 2/2009 |

OTHER PUBLICATIONS

Dry, C. M: 'Three designs for the internal release of sealants, adhesives, and waterproofing chemicals into concrete to reduce permeability' Cement and Concrete Research vol. 30, 2000, pp. 1969-1977.

Decision on grant for the equivalent Russian patent application No. 2013111848 issued on Sep. 11, 2014.

* cited by examiner

SELF-REPAIRING CEMENTS

TECHNICAL FIELD

The present disclosure relates to self-adaptive cements. In particular, it relates to set cements that are "self-healing," i.e., formulations that can adapt to compensate for changes or faults in the physical structure of the cement, or which adapt their structure after the setting phase of the cement in the cementing of oil, gas, water or geothermal wells, or the like.

BACKGROUND

During the construction of wells, cement is used to secure and support casing inside the well and prevent fluid communication between the various underground fluid-containing layers or the production of unwanted fluids into the well.

Various approaches have been developed to prevent failure of the cement sheath. One approach is to design the cement sheath to take into account physical stresses that might be encountered during its lifetime. Such an approach is described for example in U.S. Pat. No. 6,296,057. Another approach is to include, in the cement composition, materials that improve the physical properties of the set cement. U.S. Pat. No. 6,458,198 describes the addition of amorphous metal fibers to the cement slurry to improve its strength and resistance to impact damage. EP 1129047 and WO 00/37387 describe the addition of flexible materials (rubber or polymers) to the cement to confer a degree of flexibility on the cement sheath.

Nevertheless, the above-described approaches do not allow restoration of the zonal isolation once the cement sheath has actually failed due to the formation of cracks or microannuli.

A number of self-healing concretes are known for use in the construction industry. These are described for example in U.S. Pat. No. 5,575,841, U.S. Pat. No. 5,660,624, U.S. Pat. No. 5,989,334, U.S. Pat. No. 6,261,360 and U.S. Pat. No. 6,527,849, and in the document entitled "Three designs for the internal release of sealants, adhesives, and waterproofing chemicals into concrete to reduce permeability", Dry, C. M., Cement and Concrete Research 30 (2000) 1969-1977.

Nevertheless, none of these self-healing concretes are immediately applicable to well cementing operations because of the need for the material to be pumpable during placement.

"Self-healing" cements were eventually developed for oil and gas industry applications such as described in U.S. 2007/0204765 A1, WO 2004/101951 and WO 2004/101952 A1. These formulations generally contain additives that react and/or swell upon contact with downhole fluids. When cement-sheath deterioration occurs, exposing the cement matrix or cement-sheath surfaces to downhole fluids, the additives respond and seal cracks or fissures, thereby restoring cement-matrix integrity and zonal isolation. Well cements are potentially exposed to several fluid types during service, including liquid and gaseous hydrocarbons, water, brines and/or carbon dioxide. Thus, depending on the anticipated wellbore environment, it would be desirable to incorporate additives that are able to respond to one or more types of downhole fluids.

Despite the many valuable contributions from the art, it would be desirable to have access to a self-healing set cement that responds to formation fluids that contain high concentrations of gaseous hydrocarbons.

SUMMARY

The present disclosure provides set cements that are self-healing when exposed to hydrocarbons, and methods by which they may be prepared and applied in subterranean wells.

In an aspect, embodiments relate to methods for maintaining zonal isolation in a subterranean well that penetrates one or more hydrocarbon-containing formations.

In a further aspect, embodiments relate to uses of thermoplastic block-polymer particles to impart self-healing properties to a cement formulation that is placed in a subterranean well penetrating one or more hydrocarbon-containing formations.

DETAILED DESCRIPTION

At the outset, it should be noted that in the development of any such actual embodiment, numerous implementations—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

This disclosure concerns compositions for cementing subterranean wells, comprising a settable material, water and at least one additive that swells in the event of structural failure of or damage to the set material (i.e., the cement sheath). Such behavior restores and maintains a physical and hydraulic barrier in the failure zone. As a result, zonal isolation in the subterranean well is preserved. Such set cements are said to be "self-healing" or "self-repairing." In this application, both terms are used indifferently, and are to be understood as the capacity of a cement sheath to restore hydraulic isolation after suffering a matrix-permeability increase, structural defects such as cracks or fissures, or debonding from casing or formation surfaces (i.e., microannuli).

Examples of settable materials include (but are not limited to) Portland cement, microcement, geopolymers, mixtures of cement and geopolymer, plaster, lime-silica mixtures, resins, phosphomagnesium cements or chemically bonded phosphate ceramics (CBPCs).

As stated earlier, there is a need for self-healing set cements that operate in an environment containing high concentrations of gaseous hydrocarbons, methane in particular. Surprisingly, the inventors have discovered that self-healing properties may be achieved in this environment by incorporating thermoplastic block-polymer particles in the cement formulation. Typical block polymers comprise alternating sections of one chemical compound separated by sections of a different chemical compound, or a coupling group of low molecular weight. For example, block polymers can have the structure (A-b-B-b-A), wherein A represents a block that is glassy or semi-crystalline and B is a block that is elastomeric. In principle, A can be any polymer that is normally regarded as thermoplastic (e.g., polystyrene, polymethylmethacrylate, isotactic polypropylene, polyurethane, etc.), and B can be any polymer that is normally regarded as elastomeric (e.g., polyisoprene, polybutadiene, polyethers, polyesters, etc.).

Further embodiments relate to methods for maintaining zonal isolation in a subterranean well having a borehole that penetrates one or more hydrocarbon-containing formations. The method comprises pumping a cement slurry comprising thermoplastic block-polymer particles into the well, and allowing the cement slurry to form a cement sheath. Those skilled in the art will recognize that a cement slurry is generally considered to be pumpable when its viscosity is less than or equal to 1000 mPa-s at a shear rate of 100 $s^{-1}$, throughout the temperature range the slurry will experience during placement in the well. The cement sheath may be located between the well casing and the borehole wall, or between the casing and another casing string. If microannuli, cracks or defects occur in the cement sheath, the casing-cement interface or the cement-borehole wall interface, the particles will be exposed to formation hydrocarbons, causing them to swell and enabling the cement sheath to have self-healing properties.

Yet further embodiments aim at uses of thermoplastic block-polymer particles to impart self-healing properties to a set cement sheath in a subterranean well that penetrates one or more hydrocarbon-containing formations. The particles swell when contacted by hydrocarbons from the formation, in particular gaseous hydrocarbons.

For all aspects, the tensile strength of the block polymer may be varied between (but is not limited to) about 1.5 MPa and 40 MPa, preferably between 3.4 to 34 MPa. Even more preferred tensile-strength may be between 2 MPa and 3.45 MPa or between 28 MPa and 34 MPa.

Preferred thermoplastic block polymers include styrene-isoprene-styrene (SIS), styrene-butadiene-styrene (SBS) and mixtures thereof. The block-polymer-additive may be in one or more shapes, including (but not limited to) spherical, ovoid, fibrous, ribbon-like and in the form of a mesh.

The concentration of the block-polymer particles is preferably between about 10% and 55% by volume of solids in the cement slurry, also known as percentage by volume of blend (BVOB). A more preferred particle concentration lies between about 20% and 50% BVOB. The particle-size range is preferably between about 100 μm and 900 μm, and more preferably between about 200 μm and 800 μm.

One of the current challenge that the industry is facing is the presence in some wells of high concentration of gaseous hydrocarbons such as methane, propane and/or ethane. Such gaseous hydrocarbons being much more volatile than hydrocarbons in liquid form have the tendency to penetrate the failures and/or microannuli that can be present and the cement sheath and thus modifying the pressure and safety conditions of the well as the integrity is diminished. The inventors have determined that the present compositions can solve this problem up to very high concentration of gaseous hydrocarbon. In a preferred embodiment, the gaseous concentration of hydrocarbon fluid is greater than about 91 mol %, and more preferably above about 95 mol %. In addition, the hydrocarbon pressure to which the cement sheath is exposed is preferably above about 3.5 MPa, more preferably above about 6.9 MPa and most preferably above about 13.7 MPa.

The block-polymer particles may be further encapsulated by a protective layer. The layer may rupture or degrade upon exposure to one or more triggers, including (but not limited to) contact with a hydrocarbon, propagation of a crack within the set-cement matrix, time and/or temperature.

In addition to the block-polymer particles, the cement slurries may also comprise customary additives such as retarders, accelerators, extenders, fluid-loss-control additives, lost-circulation additives, gas-migration additives and antifoam agents. Furthermore, the cement slurries may contain additives that enhance the flexibility and/or toughness of the set cement. Such additives include (but are not limited to) flexible particles having a Young's modulus below about 5000 MPa and a Poisson's ratio above about 0.3. Preferably, such particles would have a Young's modulus below about 2000 MPa. Examples include (but are not limited to) polypropylene, polyethylene, acrylonitrile butadiene, styrene butadiene and polyamide. Such additives may also include fibers selected from the list comprising polyamide, polyethylene and polyvinyl alcohol. Metallic microribbons may also be included.

The block-polymer particles may also be used in engineered-particle-size cement formulations involving trimodal or quadrimodal blends of small, medium and coarse particles. Such as formulations exemplified in U.S. Pat. No. 5,518,996 and/or CA 2,117,276.

The block-polymer particles may be further associated with one or more compounds from the list comprising an aqueous inverse emulsion of polymer comprising a betaine group, poly-2,2,1-bicyclo heptene (polynorbornene), alkyl-styrene, crosslinked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene-butadiene rubber, styrene/propylene/diene monomer, brominated poly(isobutylene-co-4-methylstyrene), butyl rubber, chlorosulphonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulphonated polyethylene, fluoro silicone rubbers, fluoroelastomer and substituted styrene acrylate copolymers.

Those skilled in the art will appreciate that the disclosed method and use may not necessarily be applied throughout the entire length of the subterranean interval being cemented. In such cases, more than one cement-slurry composition is placed sequentially. The first slurry is called the "lead," and the last slurry is called the "tail." Under these circumstances, it is preferred that the inventive slurry be placed such that it resides in regions where hydrocarbons exist. In most cases, this will be at or near the bottom of the well; therefore, the inventive method and use would preferably apply to the tail. Those skilled in the art will also appreciate that the disclosed method and use would not only be useful for primary cementing, but also for remedial cementing operations such as squeeze cementing and plug cementing.

Other and further objects, features and advantages will be readily apparent to those skilled in the art upon a reading of the description of the examples which follows, taken in conjunction with the accompanying drawings.

EXAMPLES

The following examples serve to further illustrate the disclosure.

Table 1 lists the styrene-isoprene-styrene (SIS) polymers and styrene-butadiene-styrene (SBS) polymers that were used in the examples.

Example 1

Several polymer particles were placed inside a pressure cell equipped with a window that allows one to observe the behavior of materials within the cell. The cell supplier was Temco Inc., Houston, Tex. (USA). The cell temperature was also adjustable. A camera captured images from inside the pressure cell, and image-analysis software was employed to interpret the behavior of materials inside the cell. For particle-size measurements, the software examined the cross-sectional area of the particles in the cell.

After the polymer particles were introduced into the cell, the cell was sealed. The cell was then heated to the desired temperature. The initial particle sizes were measured.

A methane-gas line was then connected to the cell, and the methane pressure was raised to 21 MPa over a 3-min period. The cell pressure was maintained for 2 hr, after which the particle sizes were measured again.

Figure 1:
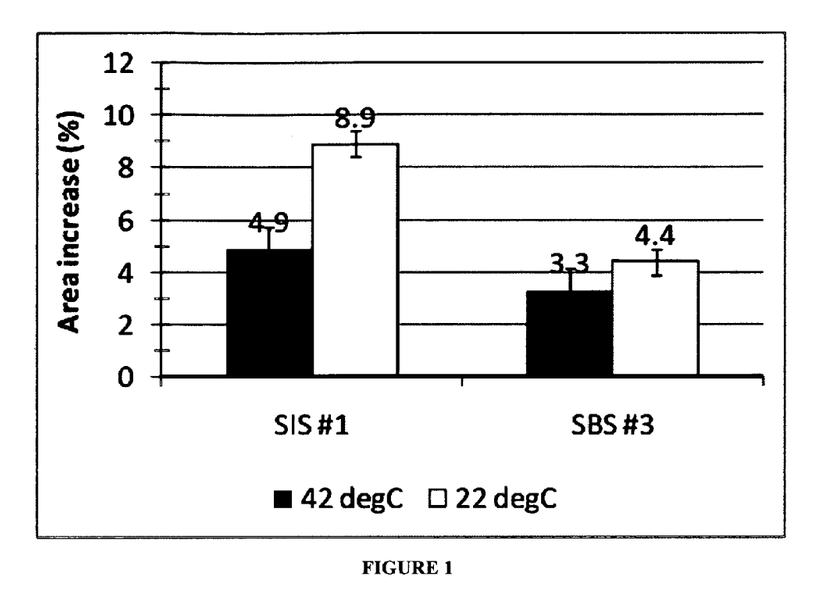
FIG. 1 is a plot showing the swelling characteristics of styrene-isoprene-styrene (SIS) and styrene-butadiene-styrene (SBS) particles in the presence of methane at various temperatures and pressures.

Tests were performed at 22° C. and 42° C. with an SIS polymer (SIS #1 from Table 1) and an SBS polymer (SBS #3). The results are presented in FIG. 1. At both temperatures, both SIS and SBS polymer demonstrated good performance.

Example 2

The properties of cement slurries containing SIS or SBS particles were measured. The tests conformed to standard methods published by the International Organization for Standards (ISO): "Petroleum and natural gas industries—Cements and materials for well cementing—Part 2: Testing of well cements," International Organization for Standards Publication No. ISO 10426-2. Two cement slurries were tested—one containing SIS particles (SIS #1), and the other containing SBS particles (SBS #3). The test conditions were as follows—bottomhole static temperature: 53° C.; bottomhole circulating temperature: 44° C.; bottomhole pressure: 21 MPa (3000 psi).

The composition of the slurry containing SBS is given in Table 2, and the test results are presented in Tables 3 and 4. The slurry density was 1606 kg/m$^3$, and the solid volume fraction (SVF) of the slurry was 51.8%.

TABLE 1

Suppliers and Properties of SIS and SBS Polymers Employed in Examples.*

| Property | SIS #1 | SIS #2 | SBS #1 | SBS #2 | SBS #3 | SBS #4 |
| --- | --- | --- | --- | --- | --- | --- |
| Supplier | ICO POLYMERS | KRATON | ICO POLYMERS | ICO POLYMERS | ICO POLYMERS | KRATON |
| Product Name | ICO1 | D1161 PTM | ICO 3 | ICO 4 | ICO 5 | D1192 EM |
| Melt Index (200° C./5 kg) (g/10 min) | 13 | 13.5 | <1 | 23-37 | <1 | <1 |
| Density (kg/m$^3$) | 963 | 920 | 940 | 940 | 981 | 940 |
| Tensile strength at break (MPa) | 17 | 21 | 16 | 10 | 33 | |
| Hardness, Shore A (30 s) | 24 | 32 | | | 72 | 70 |
| Elongation at break (%) | 1400 | 1300 | 680 | 900 | 880 | |

*Test methods:
ISO 1133 (Melt Index measurement)
ISO 37 (Tensile Strength at Break and Elongation at Break measurements)
ISO 2781 (Density measurement)
ISO 868 (ICO Polymers) and ASTM 2240 (Kraton) (Hardness measurement)

TABLE 2

Composition of Test Cement Slurry Containing SBS as Self-Healing Particle.

| Component | Type | Quantity (kg/m$^3$) |
| --- | --- | --- |
| Cement | Class G Portland cement | 696 |
| Self-healing particle | SBS #3 | 214.5 |

TABLE 2-continued

Composition of Test Cement Slurry Containing SBS as Self-Healing Particle.

| Component | Type | Quantity (kg/m³) |
|---|---|---|
| Silica | 200 mesh (74 μm) | 200.5 |
| Water | Fresh | 395 |
| Lightweight particle | Acrylonitrile-butadiene copolymer | 5 |
| Antifoam | Polypropylene glycol | 4 |
| Dispersant | Polymelamine sulfonate | 9 |
| Antisettling | 90% crystalline silica; 10% polysaccharide biopolymer | 1 |
| Fluid-loss additive | RHODOFLAC ™, available from Rhodia Nederland | 72 |
| Retarder | Calcium Lignosulfonate | 2.5 |

TABLE 3

Rheological Properties of Test Cement Slurry Containing SBS as Self-Healing Particle.

| Mixing | 20-min Conditioning |
|---|---|
| PV: 233 cP | PV: 219 cP |
| Ty: 4.3 kPa (9 lbf/100 ft²) | Ty: 8.1 kPa (17 lbf/100 ft²) |

TABLE 4

Additional Properties of Test Cement Slurry Containing SBS as Self-Healing Particle.

| Measurement | Results |
|---|---|
| Free fluid | 0.8% |
| Fluid loss | 13 mL |
| Thickening time | 8:53 (to 70 Bearden consistency, Bc) |
| Compressive strength development | 500 psi [3.4 MPa] (UCA) after 23:42<br>783 psi [5.4 MPa] (crush); 512 psi [3.5 MPa] (UCA) after 24:00<br>1316 psi [9 MPa] crush (996 psi [6.9 MPa] (UCA) after 72:00<br>1000 psi [7 MPa] (UCA) after 72:58 |
| Tensile strength* | 1.9 MPa |

*Cement was cured for 7 days at 53° C. and 20 MPa before measuring tensile strength.

The composition of the slurry containing SIS is given in Table 5, and the test results are presented in Tables 6 and 7. The slurry density was 1606 kg/m³, and the solid volume fraction (SVF) of the slurry was 51.7%.

TABLE 5

Composition of Test Cement Slurry Containing SIS as Self-Healing Particle.

| Component | Type | Quantity (kg/m³) |
|---|---|---|
| Cement | Class G Portland cement | 694 |
| Self-healing additive | SIS #1 | 208 |
| Antifoam | Polypropylene Glycol | 5 |
| Silica | 200 mesh (74 μm) | 219 |
| Water | Fresh | 393 |
| Dispersant | Polymelamine Sulfonate | 8 |
| Antisettling | Biopolymer | 1 |
| Fluid loss | RHODOFLAC ™, available from Rhodia Nederland | 81 |

TABLE 6

Rheological Properties of Test Cement Slurry Containing SIS as Self-Healing Particle.

| Mixing | 20-min Conditioning |
|---|---|
| PV: 119 cP | PV: 107 cP |
| Ty: 6.7 KPa (14 lbf/100 ft²) | Ty: 9.1 KPa (19 lbf/100 ft²) |

TABLE 7

Additional Properties of Test Cement Slurry Containing SIS as Self-Healing Particle.

| Measurement | Results |
|---|---|
| Free water | 0.3% |
| Thickening time | 4:13 (to 70 Bearden consistency) |
| Compressive strength development (measured by UCA) | 500 psi after 11:52<br>867 psi after 24:00<br>1000 psi after 32:00<br>1260 psi after 72:00 |

Example 3

Various cement formulations containing SIS or SBS were evaluated for their self-healing properties. The slurry compositions are presented in Table 8. The formulation that contains acrylonitrile-butadiene copolymer rubber (ABCR) was included as a control with no self-healing capability.

TABLE 8

Slurry Compositions for Self-Healing Tests.

| Particle type | Unit | ABCR | SIS #1 | SIS #2 | SBS #1 | SBS #2 | SBS #3 | SBS #4 |
|---|---|---|---|---|---|---|---|---|
| Density | (kg/m³) | 1571 | 1498 | 1606 | 1498 | 1498 | 1498 | 1606 |
| SVF | (%) | 55 | 50.3 | 52.3 | 50 | 50.6 | 50 | 52 |
| Particle | (kg/m³) | 286 | 240 | 210 | 243 | 239 | 243 | 213 |
| Cement | | 616 | 560 | 645 | 555 | 563 | 553 | 641 |
| Silica | | 219 | 199 | 281 | 197 | 200 | 196 | 279 |
| Water | | 436 | 494 | 459 | 498 | 491 | 497 | 463 |
| Antifoam* | | 3 | 4 | 3 | 4 | 4 | 6 | 3 |
| Dispersant* | | 5 | 0 | 5 | 0 | 0 | 3 | 5 |
| Antisettling* | | 1 | 1 | 1 | 1 | 1 | 1 | 1 |
| Retarder* | | 5 | 0 | 0 | 0 | 0 | 0 | 0 |

*Antifoam Agent: polypropylene glycol; Dispersant: polymelamine sulfonate; Antisettling Agent: 90% crystalline silica, 10% polysaccharide biopolymer; Retarder: calcium lignosulfonate.

Each cement slurry was prepared according to the method described in ISO Publication 10426-2, and samples were prepared in the manner required to perform a Brazilian tensile-strength test. This test is also described in ISO Publication 10426-2. The cement-core samples were 66 mm long and 22 mm in diameter. The samples were cured at room temperature and atmospheric pressure. The curing times are presented in Table 9. Columns with two numbers indicate that two tests were performed.

TABLE 9

Curing times.

| Particle name | ABCR | SIS #1 | SIS #2 | SBS #1 | SBS #2 | SBS #3 | SBS #4 |
|---|---|---|---|---|---|---|---|
| Curing time (days) | 40/121 | 48 | 104 | 101 | 79/77 | 78/105 | 100 |

Figure 2:
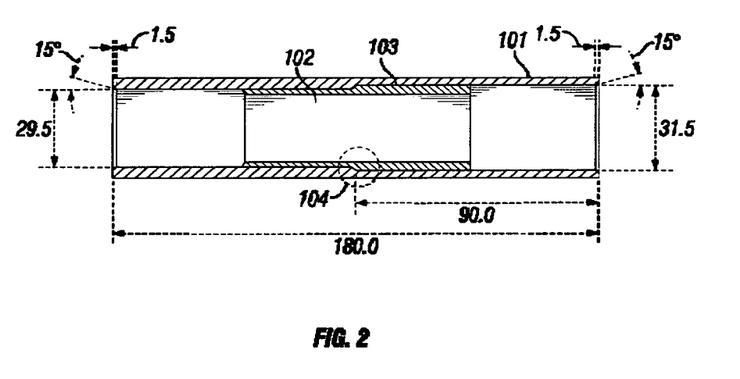
FIG. 2 is a schematic diagram of an experimental apparatus for measuring the self-healing ability of fractured cement samples.

The samples were fractured by the Brazilian method, then transferred to a steel tube and secured by a sealing cement. As shown in FIG. 2, the steel tube 101 is 180 mm long. There are two 90-mm sections—one with an internal diameter of 31.5 mm, the other with an internal diameter of 29.5 mm. The fractured cement sample 102 is placed inside the tube and the sealing cement 103 is applied around the sample. Midway along the cement sample, owing to the different tube diameters, there is an edge 104 to prevent the cement sample from sliding.

The composition of the sealing cement was a 1.88-kg/m³ Portland cement slurry containing 2.7 mL/kg polynaphthalene sulfonate dispersant, 2.7 mL/kg polysiloxane antifoam agent, 178 mL/kg styrene butadiene latex and 2.1% by weight of cement calcium chloride accelerator.

Figure 3:
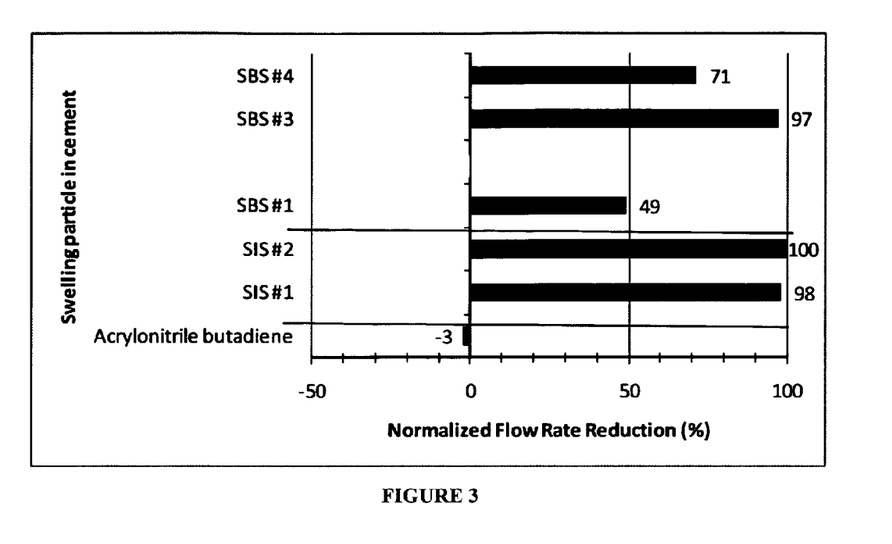
FIG. 3 presents normalized flow-rate reductions for set cements containing SIS and SBS particles exposed to methane.

Pure methane was then injected through the fractured samples for 24 hours at 21 MPa backpressure and at ambient temperature (20°-23° C.). Flow-rate and pressure variations were recorded, and normalized flow rates were calculated. The results are shown in FIG. 3.

The cement matrices incorporating SIS particles demonstrated normalized flow-rate reductions greater than 98%. The performance of cement matrices incorporating SBS particles demonstrated flow-rate reductions between 49% and 97%. The control did not show a flow-rate reduction.

Example 4

Using the methods described in Example 3, the effect of slurry density on the performance of set cements containing SIS#1 or SBS#3 was investigated. The slurry compositions are shown in Table 10.

TABLE 10

Slurry Compositions for Self-Healing Tests

| Density | (kg/m³) | 1606 | 1606 | 1498 | 1498 |
|---|---|---|---|---|---|
| SVF | (%) | 52 | 51.5 | 50.3 | 50.7 |
| Particle type | | SIS#1 | SBS#3 | SIS#1 | SBS#3 |
| Particle | (kg/m³) | 213 | 216 | 240 | 242.5 |
| Class G cement | | 641.5 | 635.5 | 560 | 554.3 |
| Silica | | 280 | 277 | 199 | 196 |
| Water | | 462.5 | 467.5 | 494 | 496.5 |
| Antifoam | | 5 | 5 | 4 | 4 |
| Dispersant | | 3 | 3 | 0 | 3 |
| Antisettling | | 1 | 1 | 1 | 1 |

Figure 4:
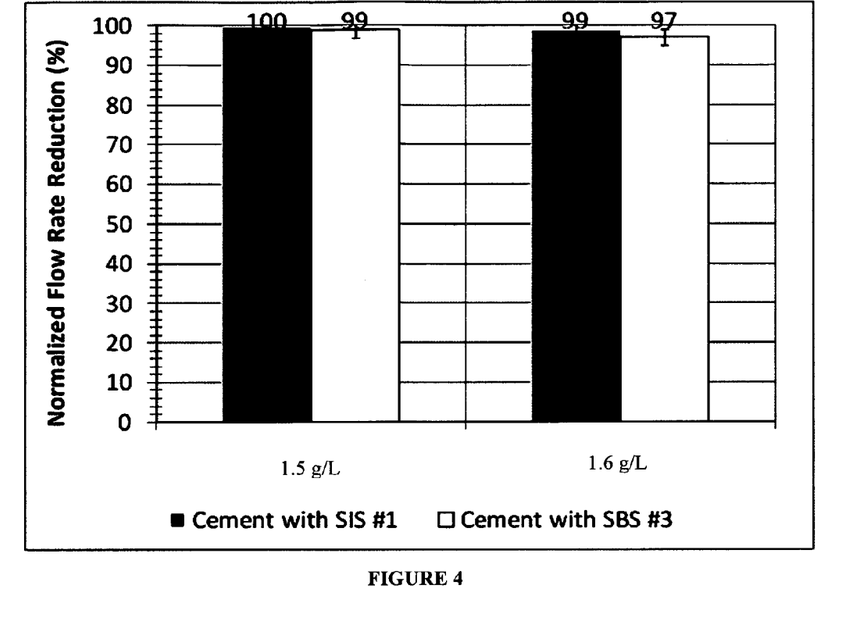
FIG. 4 presents the effect of slurry density on normalized flow-rate reductions for set cements containing SIS and SBS particles exposed to methane.

The cement slurries were cured for 7 days at 53° C. and 20 MPa. The self-healing test results are presented in FIG. 4. For both cement matrices, density variation does not affect performance in terms of flow-rate reduction.

Example 5

Using the methods described in Example 3, the effect of pressure on the performance of set cements containing SIS#1 or SBS#3 was investigated. The 1606-kg/m³ formulations from Table 9 were tested.

Figure 5:
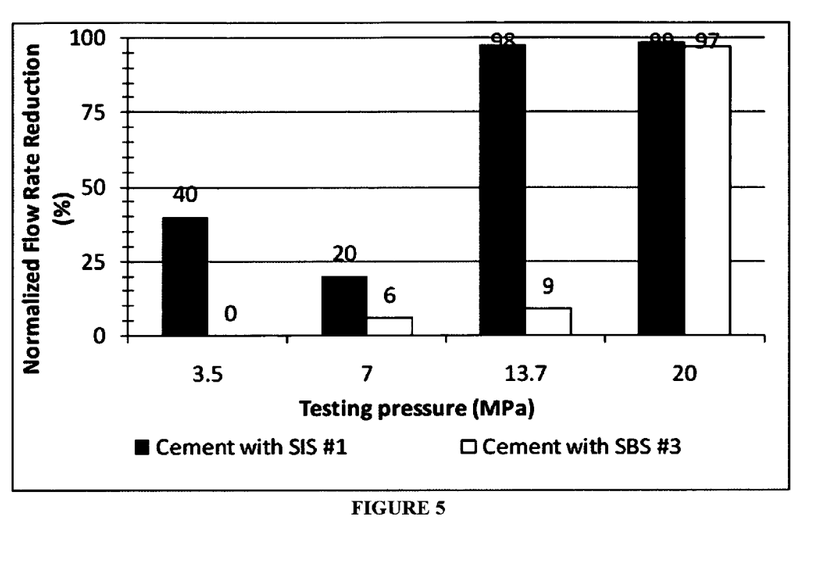
FIG. 5 presents normalized flow-rate reductions for set cements containing SIS and SBS particles exposed to methane at various pressures.

The samples were cured for 7 days at 53° C. and 20 MPa. Flow-rate-reduction measurements were performed at four methane pressures: 3.5 MPa, 7 MPa, 13.7 MPa and 20 MPa. The results, presented in FIG. 5, indicate that flow-rate reduction was achieved at 3.5 MPa for the set cement containing SIS, and at 7 MPa for the set cement containing SBS.

The invention claimed is:

1. A method for maintaining zonal isolation in a subterranean well in which a borehole penetrates one or more methane-containing formations, comprising:
   (i) pumping a cement slurry comprising water, cement and thermoplastic block-polymer particles into the well, wherein the particles consist of styrene-isoprene-styrene polymer particles, and the polymer has a tensile strength between 1.5 MPa and 40 MPa; and
   (ii) allowing the cement slurry to set and form a cement sheath; and
   (iii) after microannuli, cracks or defects occur in the cement sheath, allowing the methane to contact the particles, thereby causing the particles to swell in response to contact with the methane, and enabling the cement sheath to undergo a hydraulic conductivity reduction of at least 97% and have self-healing properties,
   wherein the methane is present at a concentration higher than 91 mol % and at a pressure higher than 3.5 MPa.

2. The method of claim 1, wherein the concentration of the particles is between 10% and 55% by volume of cement-slurry solids.

3. The method of claim 1, wherein the size of the particles is between 100 μm and 900 μm.

4. The method of claim 1, wherein the slurry further comprises one or more particles selected from the list consisting of an aqueous inverse emulsion of polymer comprising a betaine group, poly-2,2,1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene/propylene/diene monomer, brominated poly (isobutylene-co-4-methylstyrene), butyl rubber, chlorosulfonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulfonated polyethylene, fluoro silicone rubbers and fluoroelastomers.

5. The method of claim 1, wherein a normalized methane flow rate through the cement sheath is reduced by at least 98 percent.

6. A method, comprising:
   imparting self-healing properties to a cement formulation that is placed in a subterranean well penetrating one or more methane containing formations, the methane being present at a concentration higher than 91 mol % and at a pressure higher than 3.5 MPa;

wherein the cement once set, the cement forms a cement sheath and, after microannuli, cracks or defects occur in the cement sheath, the particles swell when contacted by the methane and cause the cement sheath to undergo a hydraulic conductivity reduction of at least 97%, and wherein said imparting is achieved by including thermoplastic block-polymer particles in the cement, wherein the particles consist of styrene-isoprene-styrene polymer particles, and the polymer has a tensile strength between 1.5 MPa and 40 MPa.

7. The method of claim 6, wherein the concentration of the particles is between 10% and 55% by volume of cement-slurry solids.

8. The method of claim 6, wherein the size of the particles is between 100 μm and 900 μm.

9. The method of claim 6, wherein the slurry further comprises one or more particles selected from the list consisting of an aqueous inverse emulsion of particles comprising a betaine group, poly-2,2,1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene/propylene/diene monomer, brominated poly (isobutylene-co-4-methylstyrene), butyl rubber, chlorosulphonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulphonated polyethylene, fluoro silicone rubbers; fluoroelastomers and substituted styrene acrylate copolymer.

10. The method of claim 6, wherein a normalized methane flow rate through the cement sheath is reduced by at least 98 percent.

11. A method for maintaining zonal isolation in a subterranean well in which a borehole penetrates one or more hydrocarbon-containing formations, comprising:

(i) pumping a cement slurry comprising water, cement and thermoplastic block-polymer particles into the well, wherein the particles consist of a styrene-butadiene-styrene polymer, and the polymer has a tensile strength between 1.5 MPa and 40 MPa; and (ii) allowing the cement slurry to set and form a cement sheath; and (iii) after microannuli, cracks or defects occur in the cement sheath, allowing formation hydrocarbons to contact the particles, thereby causing the particles to swell, and enabling the cement sheath to have self-healing properties, wherein a flow rate through the cement sheath is reduced by at least 49%, and wherein the hydrocarbon comprises at least 91 mol % methane, the hydrocarbon being present at a pressure higher than 3.5 MPa.

12. A method, comprising:

imparting self-healing properties to a cement formulation that is placed in a subterranean well penetrating one or more hydrocarbon-containing formations, the cement formulation comprising water, cement and thermoplastic block copolymer particles that consist of a styrene-isoprene-styrene polymer having a tensile strength between 1.5 MPa and 40 MPa, wherein the cement formulation sets and forms a cement sheath and, after microannuli, cracks or defects occur in the cement sheath, the particles swell when contacted by formation hydrocarbons comprising at least 91 mol % methane, the hydrocarbons being present at a pressure higher than 3.5 MPa and wherein the cement sheath undergoes a hydraulic conductivity reduction of at least 97%.

* * * * *